United States Patent
Park et al.

(10) Patent No.: US 10,146,342 B2
(45) Date of Patent: Dec. 4, 2018

(54) APPARATUS AND METHOD FOR CONTROLLING OPERATION OF AN ELECTRONIC DEVICE

(71) Applicant: Samsung Electronics Co., Ltd., Gyeonggi-do (KR)

(72) Inventors: Hyung-Jin Park, Gyeonggi-do (KR); Kyung-Hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/221,904

(22) Filed: Mar. 21, 2014

(65) Prior Publication Data

US 2014/0285452 A1    Sep. 25, 2014

(30) Foreign Application Priority Data

Mar. 21, 2013  (KR) .................. 10-2013-0030476

(51) Int. Cl.
  *G06F 3/041* (2006.01)
  *G06F 3/0488* (2013.01)

(52) U.S. Cl.
  CPC .......... *G06F 3/041* (2013.01); *G06F 3/04883* (2013.01); *G06F 2203/04101* (2013.01)

(58) Field of Classification Search
  None
  See application file for complete search history.

(56) References Cited

U.S. PATENT DOCUMENTS

| | | |
|---|---|---|
| 2008/0174570 A1 | 7/2008 | Jobs et al. |
| 2008/0305836 A1 | 12/2008 | Kim et al. |
| 2010/0095206 A1* | 4/2010 | Kim ................. G06F 3/017 715/702 |
| 2010/0289740 A1 | 11/2010 | Kim et al. |
| 2012/0235947 A1* | 9/2012 | Yano et al. ............ 345/173 |
| 2012/0313882 A1* | 12/2012 | Aubauer .............. G06F 3/046 345/174 |

FOREIGN PATENT DOCUMENTS

| | | |
|---|---|---|
| KR | 20080005341 | 1/2008 |
| KR | 1020080107574 | 12/2008 |
| KR | 1020100124113 | 11/2010 |

* cited by examiner

*Primary Examiner* — Joseph Haley
(74) *Attorney, Agent, or Firm* — The Farrell Law Firm, P.C.

(57) ABSTRACT

An apparatus and a method for controlling an operation of an electronic device are provided. The method includes detecting a first input or a second input corresponding to a proximity distance of an input instrument in proximity to a display screen; identifying an input combination which includes at least one of the first input, the second input, or a combination of the first and second inputs which are inputted at a predetermined time interval; and performing a predetermined function corresponding to the identified input combination.

15 Claims, 5 Drawing Sheets

| | | |
|---|---|---|
| 410 — | L | A FUNCTION — 410a |
| 420 — | H | B FUNCTION — 420a |
| 430 — | L → H | C FUNCTION — 430a |
| 440 — | L → H → L | D FUNCTION — 440a |
| 450 — | L → H → L → H | E FUNCTION — 450a |
| 460 — | L → H → L + GESTURE1 | F FUNCTION — 460a |
| 470 — | L → H → L → H + GESTURE2 | G FUNCTION — 470a |
| | ⋮ | ⋮ |

| | | |
|---|---|---|
| 410 — | L | A FUNCTION — 410a |
| 420 — | H | B FUNCTION — 420a |
| 430 — | L → H | C FUNCTION — 430a |
| 440 — | L → H → L | D FUNCTION — 440a |
| 450 — | L → H → L → H | E FUNCTION — 450a |
| 460 — | L → H → L + GESTURE1 | F FUNCTION — 460a |
| 470 — | L → H → L → H + GESTURE2 | G FUNCTION — 470a |
| | ⋮ | ⋮ |
| | ⋮ | ⋮ |
| | ⋮ | ⋮ |
| | ⋮ | ⋮ |

FIG.4

APPARATUS AND METHOD FOR CONTROLLING OPERATION OF AN ELECTRONIC DEVICE

PRIORITY

This application claims priority under 35 U.S.C. § 119(a) to Korean Application Serial No. 10-2013-0030476, which was filed in the Korean Intellectual Property Office on Mar. 21, 2013, the entire disclosure of which is incorporated herein by reference.

BACKGROUND OF THE INVENTION

1. Field of the Invention

The present invention relates generally to an operation control of an electronic device, and more particularly to an apparatus and a method for controlling an operation of an electronic device using a proximity input or a touch input.

2. Description of the Related Art

With the improvement of performance of electronic devices, recently developed electronic devices provide more than a single function. For example, a portable terminal such as a smart phone has provided numerous functions such as a multimedia player function, an electronic book reader function, a word processor function, a game player function, and the like.

According to a current trend in the electronic devices, the recent electronic devices have generally employed a touch screen, and a user has controlled various operations of the electronic devices through touch inputs on a display screen including a touch screen function. For example, the user executes a certain application through the touch inputs, or requests access to certain data (for example, identifying of a document data).

On the other hand, the related art classifies touch inputs into a 1) direct touch input, in which a touch input instrument, for example, a touch pen or a part of a user's body such as a finger, is in contact with a display screen, for example a touch screen, and 2) a proximity input in which the touch input instrument is not in contact with the display screen. The related art has provided a function of controlling an operation of an electronic device according to the direct touch input and the proximity input.

However, the related art has a problem in that it has provided only the simple function of distinctively controlling the operation of the electronic device according to the direct touch input and the proximity input, but has not provided a function of controlling the operation of the electronic device in a more convenient and useful manner using the proximity input.

SUMMARY OF THE INVENTION

The present invention has been made to address at least the problems and disadvantages described above, and to provide at least the advantages described below. Accordingly, aspects of the present invention provide an apparatus and a method for controlling an operation of an electronic device using any one of a proximity input and a direct touch input, which are capable of controlling the operation of the electronic device more conveniently and usefully by using a proximity input method.

In accordance with an aspect of the present invention, a method for controlling an operation of an electronic device is provided. The method includes detecting a first input or a second input corresponding to a proximity distance of an input instrument which is in proximity to a display screen; identifying an input combination which includes at least one of the first input the second input, or a combination of the first and second inputs inputted at a predetermined time interval; and performing a predetermined function corresponding to the identified input combination.

In accordance with another aspect of the present invention, an apparatus for controlling an operation of an electronic device is provided. The apparatus includes a display unit which detects a proximity input and a proximity distance to a display screen; and a controller which detects a first input or a second input according to the proximity distance of an input instrument in proximity to the display screen, identifies an input combination including at least one of the first input and the second input which are input at a predetermined time interval, and performs a predetermined function corresponding to the identified input combination.

In accordance with another aspect of the present invention, a non-transitory computer-readable storage medium which can be read by a processor and includes a program including instructions that carry out a method is provided. The method includes detecting a first input or a second input corresponding to a proximity distance of an input instrument which is proximate to a display screen; identifying an input combination which includes at least one of the first input, the second input, or a combination of the first and second inputs inputted at a predetermined time interval; and performing a predetermined function corresponding to the identified input combination.

BRIEF DESCRIPTION OF THE DRAWINGS

The above and other aspects, features, and advantages of the present invention will be more apparent from the following detailed description taken in conjunction with the accompanying drawings, in which:

FIG. 4 illustrates a process of controlling an electronic device according to an embodiment of the present invention.

DETAILED DESCRIPTION OF EMBODIMENTS OF THE PRESENT INVENTION

Figure 1:
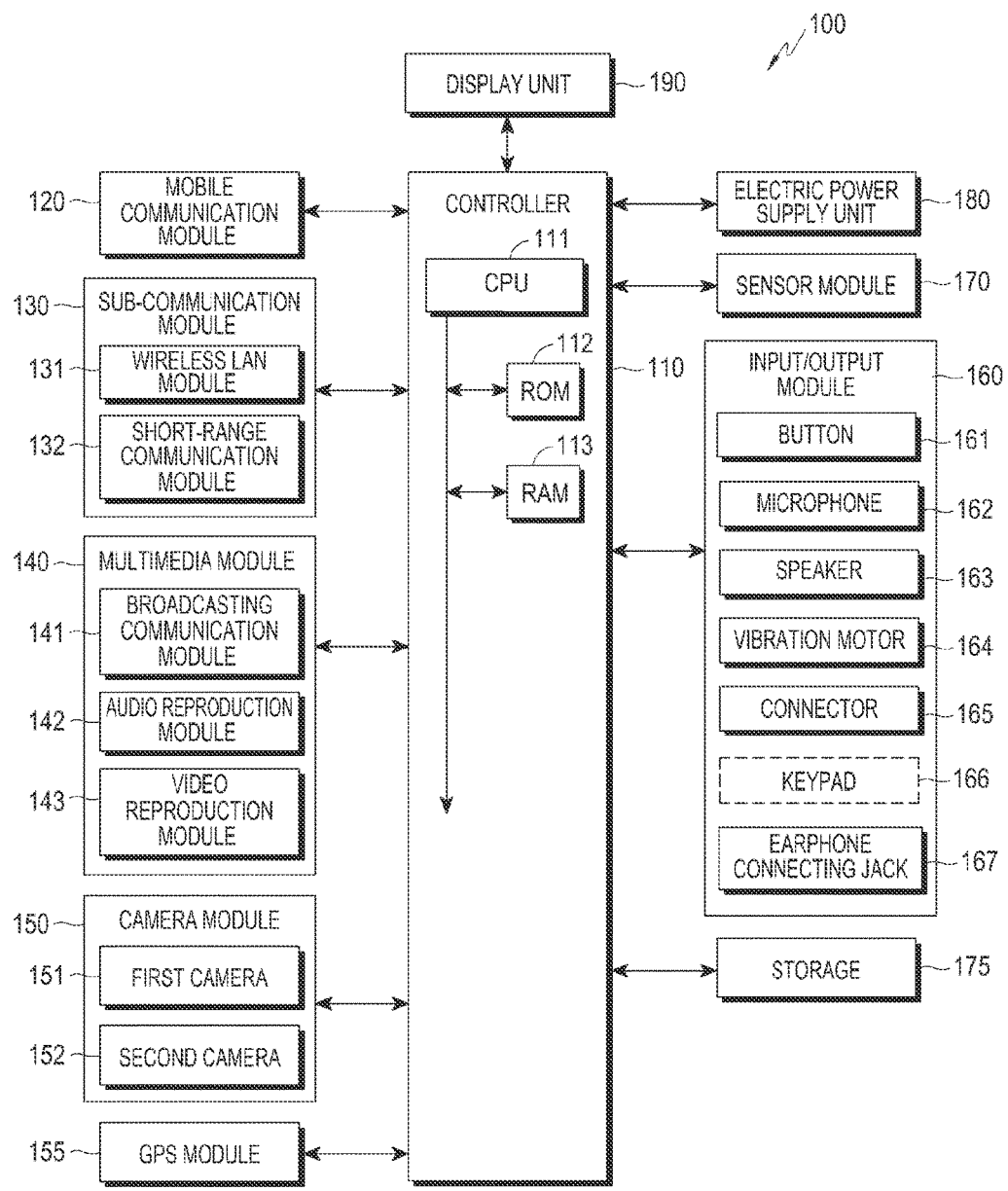
FIG. 1 is a schematic block diagram illustrating a portable terminal according to an embodiment of the present invention.

Hereinafter, embodiments of the present invention will be described with reference to the accompanying drawings. It will be understood that the present invention is not restricted or limited to the embodiments. In the drawings, identical reference numerals will be used to indicate identical elements which substantially perform the same function.

The terms, including ordinal numbers such as first, second, etc. may be used to describe various structural elements. However, the structural elements are not limited by these terms. The terms are only used to distinguish one structural element from another structural element. For example, without departing from the scope of the present invention, a first structural element can be named a second structural element. Similarly, the second structural element also can be named the first structural element. The terms in the description are used to merely describe the embodiments of the present invention, and should not limit the present invention. A singular expression includes a plural expression unless it definitely means a difference in the context.

FIG. 1 is a schematic block diagram illustrating a portable terminal according to an embodiment of the present invention.

Embodiments of the present invention can be carried out by an electronic device such as, for example, a portable terminal, which can be easily carried by a user, considering a weight or a size. Examples of the electronic device according to the embodiment of the present invention may include conventional phones and electronic devices, for example, a smart phone and a tablet PC, which are driven by an operating system such as Bada®, Tizen®, Windows®, for example Windows® 8, iOS®, Android®, etc. Additionally, the portable terminal according to an embodiment of the present invention may also include a portable computer, a digital camera, a video phone, and the like. It will be obvious to a person skilled in the art that an electronic device according to an embodiment of the present invention is not limited to the above-mentioned devices.

Referring to FIG. 1, the electronic device 100 (hereinafter, "portable terminal") can be connected to an external device (not shown) by using an external device connecting unit such as a sub-communication module 130, a connector, 165, and/or an earphone connecting jack 167. The external device may include various devices such as, for example, an earphone which is detachably connected to the portable terminal 100 by wire, an external speaker, a Universal Serial Bus (USB) memory device, a charger, a cradle/dock, a Digital Multimedia Broadcasting (DMB) antenna, a mobile payment device, a health management device (e.g., a blood-sugar meter), a game player, a navigation device for a vehicle, and the like. Further, the external device can also include a short-range communication device such as a Bluetooth® communication module and a Near Field Communications (NFC) module, a Wi-Fi direct communication device, and a wireless Access Point (AP). Furthermore, the external device can further include another electronic device such as, for example, a portable phone, a smart phone, a tablet PC, a desktop PC, and a server.

Referring to FIG. 1, the portable terminal 100 includes a controller 110, a mobile communication module 120, a sub-communication module 130, a multimedia module 140, a camera module 150, a GPS module 155, an input/output module 160, a sensor module 170, a storage 175, an electric power supply unit 180, and a display unit 190. The sub-communication module 130 includes at least one of a wireless LAN module 131 and a short-range communication module 132. The multimedia module 140 includes at least one of a broadcasting module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, a keypad 166, and the earphone connecting jack 167.

The mobile communication module 120 allows the portable terminal 100 to be connected to the external device via a mobile communication by using at least one antenna, under control of the controller 110. The mobile communication module 120 transmits and receives radio signals for a voice call, a video communication, a Short Message Service (SMS), or a Multimedia Message Service (MMS) to/from another portable terminal (not shown), a smart phone (not shown), a tablet PC, or other devices (not shown), whose telephone numbers are stored in the portable terminal 100.

The sub-communication module 130 includes at least one of the wireless LAN module 131 and the short-range communication module 132. For example, the sub-communication module 130 may include only the wireless LAN module 131, only the short-range communication module 132, or both the wireless LAN module 131 and the short-range communication module 132.

The wireless LAN module 131 includes a Wi-Fi module and can be connected to the Internet in association with a controller 110 in an area where an AP (not shown) is enabled. The wireless LAN module 131 supports the wireless LAN provision, i.e. IEEE802.11x of the Institute of Electrical and Electronics Engineers (IEEE).

The short-range communication module 132 provides a wireless near field communication function in association with the controller 110. The short-range communication module 132 may include a Bluetooth module, an Infrared Data Association (IrDA) module, an NFC module, and the like.

The multimedia module 140 may include the broadcasting module 141, the audio reproduction module 142, or the video reproduction module 143. Under a control of the controller 110, the broadcasting module 141 can receive broadcasting signals (e.g., a TV broadcasting signal, a radio broadcasting signal, or a data broadcasting signal) and additional broadcasting information (e.g., an Electric Program Guide (EPG) or an Electric Service Guide (ESG)), which are transmitted from a broadcasting station through broadcasting and communication antennas (not shown). The audio reproduction module 142, under the control of the controller 110, can reproduce digital audio files (e.g., files with file extensions mp3, wma, ogg, or wav), which are stored and/or received. The video reproduction module 143 can reproduce digital video files (e.g., files with file extensions mpeg, mpg, mp4, avi, mov, or mkw), which are stored and/or received, under the control of the controller 110. The video reproduction module 143 can also reproduce the digital audio files.

The multimedia module 140 may include the audio reproduction module 142 and the video reproduction module 143, and may exclude the broadcasting module 141. Further, the audio reproduction module 142 or the video reproduction module 143 of the multimedia module 140 may instead be included in the controller 110.

The camera module 150 can include at least one of the first camera 151 and the second camera 152 which respectively photograph a stationary image or a video under the control of the controller 110. Further, the first camera 151 or the second camera 152 can include an auxiliary light source, for example a flash (not shown), which provides an amount of light which is used to photograph. The first camera 151 is disposed on a front surface of the portable terminal 100, and the second camera 152 is disposed on a rear surface of the portable terminal 100. Alternatively, both the first camera 151 and the second camera 152 can be arranged on the rear surface at a distance of 1 to 8 cm to photograph a three-dimensional stationary image or a three-dimensional video.

The GPS module 155 receives electric waves from a plurality of GPS satellites (not shown) in Earth's orbit, and calculates a position of the portable terminal 100 by using a time of arrival from the GPS satellites to the portable terminal 100.

The input/output module 160 may include at least one of the button 161, the microphone 162, the speaker 163, the vibration motor 164, the connector 165, and the keypad 166.

The button 161 may be formed on a front surface, a side surface, or a rear surface of the portable terminal 100, and include at least one of, for example, an electric power/locking button (not shown), a volume button (not shown), a menu button, a home button, a return button, and a search button. One of ordinary skill in the art will understand that the portable terminal 100 may include one or more of the button 161.

The microphone 162 receives an input of voice or sound to generate electric signals, under a control of the controller 110.

The speaker 163 can output sounds corresponding to various signals (e.g., radio signals, broadcasting signals, digital audio signals, digital video signals, or signals relating to photographing) of the mobile communication module 120, the sub-communication module 130, the multimedia module 140, and/or the camera module 150, under a control of the controller 110. The speaker 163 can output sound, for example, button operation sound or ringtone, corresponding to functions which the portable terminal 100 performs. One or more speakers 163 can be arranged at a suitable position or positions of a housing of the portable terminal 100.

The vibration motor 164 can convert electric signals into mechanical vibration under a control of the controller 110. For example, when the portable terminal 100, which is in a vibration mode, receives a voice call from a companion device (not shown), the vibration motor 164 is actuated. One or more vibration motors 164 can be arranged in the housing of the portable terminal 100. The vibration motor 164 can operate in response to a touch/tap by which a user touches his/her finger to the display unit 190, which may be embodied as a touch screen.

The connector 165 may be used as an interface to connect the portable terminal 100 to an external device (not shown) or an electric power source (not shown). The portable terminal 100 can transmit data, which is stored in the storage unit 175, to the external device through a wired cable connected to the connector 165, or receive data from the external device, under a control of the controller 100. Further, the portable terminal 100 can receive electric power from an electric power source through the wired cable connected to the connector 165, or charge a battery using the electric power source.

The keypad 166 can receive a key input by the user to control the portable terminal 100. The keypad 166 may include a physical keypad (not shown) formed in the portable terminal 100 and/or a virtual keypad (not shown) displayed on the display unit 190. The physical keypad formed in the portable terminal 100 can be excluded according to the performance or structure thereof.

An earphone is inserted into the earphone connecting jack 167 thereby connecting the earphone to the portable terminal 100.

The sensor module 170 includes at least one sensor for detecting a status of the portable terminal 100. For example, the sensor module 170 may include a proximity sensor for detecting whether a user is in proximity of the portable terminal 100, an illuminance sensor (not shown) for detecting an amount of light around the portable terminal 100, a motion sensor (not shown) for detecting a movement (e.g., a rotation, an acceleration, and vibration) of the portable terminal 100, a geomagnetic sensor (not shown) for detecting a point of a compass using Earth's magnetic field, a gravity sensor for detecting an operating direction of gravity, and/or an altimeter for detecting an altitude by measuring a pressure of atmosphere. At least one sensor can detect a status and generate signals corresponding to the status, which in turn transmits the signals to the controller 110. The sensors of the sensor module 170 can be added to or removed from the portable terminal 100 according to the desired performance of the portable terminal 100.

The storage unit 175 stores signals or data which is input/output based on the operations of the mobile communication module 120, the sub-communication module 130, the multimedia module 140, the camera module 150, the GPS module 155, the input/output module 160, the sensor module 170, and the display unit 190, under a control of the controller 110. The storage unit 175 also stores control programs and applications for controlling the controller 110. Here, the term 'storage unit' can be interpreted to include the storage unit 175 and a ROM 112 or RAM 113 in the controller 110.

Furthermore, the storage unit 175 may include an external memory such as a Compact Flash (CF), a Secure Digital (SD) card, a Micro Secure Digital (Micro SD) card, a Mini Secure Digital (Mini SD) card, an Extreme Digital (xD) card, and/or a memory stick. In addition, the storage unit may include a disk type storage device such as a Hard Disk Drive (HDD) and a Solid State Drive (SSD).

The electric power supply unit 180 may include one or more batteries (not shown) which are disposed in the housing of the portable terminal 100, with electric power usage under a control of the controller 110. The one or more batteries supply the portable terminal 100 with the electric power. Further, the electric power supply unit 180 may supply the portable terminal 100 with electric power input from an external electric power source through a wired cable connected to the connector 165. Furthermore, the electric power supply unit 180 may supply the portable terminal 100 with electric power input from the external electric power source wirelessly, using a wireless charging technique.

The display unit 190 may include, for example, a Liquid Crystal Display (LCD) or an Organic Light Emitting Diodes (OLED) such as a Passive Matrix OLED (PMOLED) or an Active Matrix OLED (AMOLED), and display a variety of information. The display unit 190 can include a touch screen panel which may include, for example, a resistive, a capacitive, an infrared, or an acoustic wave type touch screen panel, and a touch screen panel controller.

In addition, the display unit 190 may include a panel, for example a digitizer, which receives an input of a user's electron induction type pen, for example the S pen produced by Samsung Electronics Co., and a corresponding controller. For example, the display unit 190 can include both a touch screen panel and a digitizer, and a user can touch the display screen of the display unit 190 with an input means such as, for example, a finger, suitable for the touch screen, or a pen, suitable for the digitizer.

The display unit 190 can provide the user with a user interface corresponding to various services such as, for example, a voice call, a data transmission, displaying of broadcasting, and a photographing. The touch screen of the display unit 190 can transmit analog signals, which correspond to at least one touch input (e.g., direct touch input or proximity input), which is input into the user interface, to the touch screen controller (not shown). The display unit 190 can receive at least one touch input by the input means, for example a part of a user's body such as a finger, through the touch screen.

The touch screen controller converts analog signals, which are received from the touch screen of the display unit 190, into digital signals, for example X and Y coordinates, and transmits the digital signals to the controller 110. The controller 110 can control the touch screen of the display unit 190 by using the digital signals received from the touch screen controller. For example, the controller 110 can control an application icon which is displayed on the display unit 190, to be selected, or control an application which is displayed on the display unit 190, to be executed, in response to the touch input.

The display unit 190 according to the embodiment of the present invention includes at least one of a touch screen panel and an electromagnetic induction type panel (e.g., a digitizer). Accordingly, the user can input a direct touch of touching the display screen, for example a touch screen panel or a digitizer, of the display unit 190 with an input instrument, or a proximity input, in which an input instrument comes close to the display screen within a predetermined space. In the embodiment of the present invention, the input instrument can include the user's finger interacting with a touch screen or an electromagnetic pen interacting with a digitizer.

The display unit 190 according to the embodiment of the present invention transmits a detected signal, which corresponds to a proximal distance of the input instrument in proximity to the touch screen within a predetermined space, to the controller 110. As a result, the controller 110 classifies the user's proximity input into a proximity input including a first input, a second input, and a third input.

As described below, in the embodiment of the present invention, it can be understood that the first and second inputs are the proximity inputs detected based on vertical (i.e., up and down) movements, for example far and near, over the display screen. Also, it can be understood that the third input is the proximity input e detected based on a horizontal movement, for example a variety of gesture inputs, over the display screen.

For example, if the display unit 190 includes a capacitive touch screen, the display unit 190 can detect a variation in capacitance according to a proximity distance of the input instrument with respect to the display screen, and transmit the detected signals corresponding to the variation in the capacitance to the controller 110. The controller 110 classifies the user's proximity input to the touch screen into a first input, for example H input or, and a second input, for example L input, as a function of the variation in the capacitance. At this time, the detecting of the proximity input of the input instrument can be carried out by means of the camera module 140, the proximity sensor, the ultrasonic sensor, and the like.

The controller 110 includes a CPU 111, the ROM 112, which stores a control program to control the portable terminal 100, and the RAM 113, which stores signals or data input from the exterior of the portable terminal 100, or is used as a memory region for storing an operation performed in the portable terminal 100. The CPU 111 may include a single core CPU, or a multi core CPU such as a dual core CPU, a triple core CPU, or a quad core CPU. The CPU 111, the ROM 112 and the RAM 113 may be connected to each other through an internal bus.

The controller 110 controls the mobile communication module 120, the sub-communication module 130, the multimedia module 140, the camera module 150, the GPS module 155, the input/output module 160, the sensor module 170, the storage unit 175, the electric power supply unit 180 and the display unit 190.

Additionally, the controller 110 controls the operations of the portable terminal 100, which performs a process of detecting the first input or the second input according to a proximity distance of the input instrument in proximity to the display screen, identifying an input combination which includes at least one of the first input and the second input, which is input once more and at a predetermined time interval, and performing a preset function corresponding to the identified input combination, with respect to the method of controlling the operation of the portable terminal. The operation of the controller 110 according to the embodiment of the present invention will be described in detail below.

Figure 2:
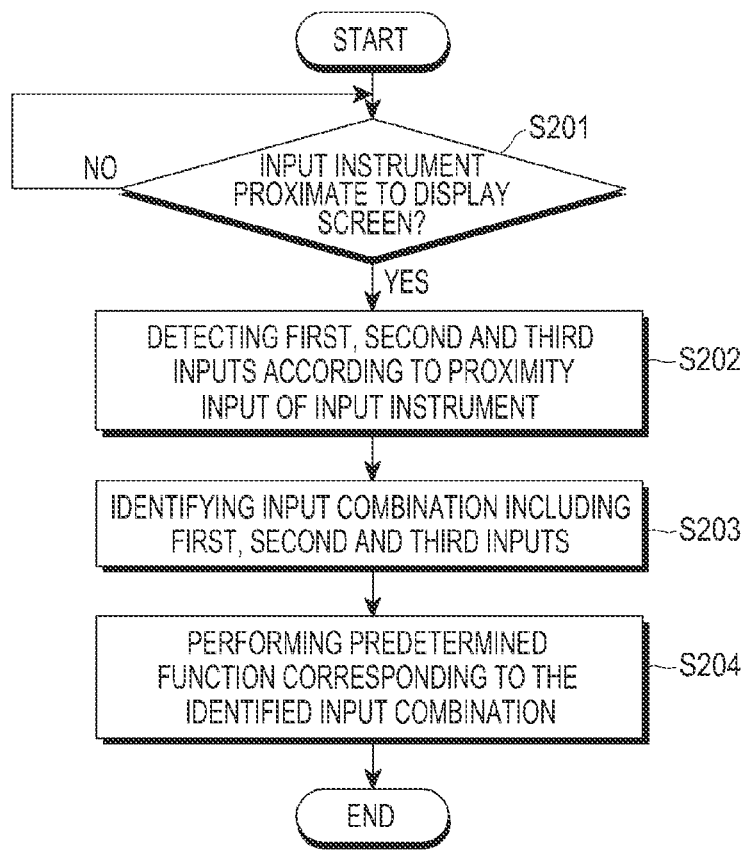
FIG. 2 is a flowchart illustrating a process of controlling an electronic device according to an embodiment of the present invention.
Figure 3A:
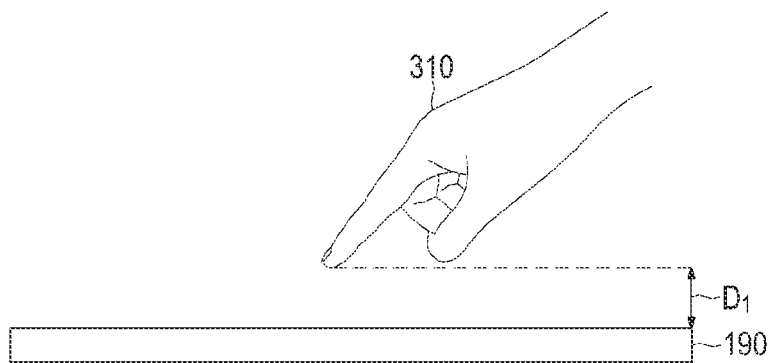
FIG. 3A illustrates a process of controlling an electronic device according to an embodiment of the present invention.

FIG. 2 is a flowchart illustrating a process of controlling an electronic device according to an embodiment of the present invention. FIGS. 3A and 3D are views illustrating a process of controlling an electronic device according to an embodiment of the present invention. FIG. 4 is a view illustrating a process of controlling an electronic device according to an embodiment of the present invention.

In step S201, the controller 110 controls the display unit 190 to detect the proximity of the input instrument to the display screen.

As a result, the display unit 190 detects the proximity of the input instrument to the display screen, and transmits the detected signal to the controller 110.

Figure 3B:
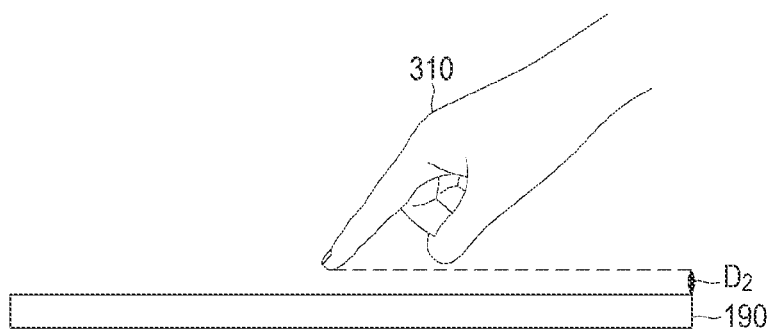
FIG. 3B illustrates a process of controlling an electronic device according to an embodiment of the present invention.

Referring to FIGS. 3A and 3B, the user places the input instrument 310 (e.g., finger) in proximity to the display screen of the display unit 190 at a predetermined distance D1 (FIG. 3A) from the display screen or at a predetermined distance D2 (FIG. 3B) from the display screen. The display unit 190 transmits detected signals corresponding to the proximity distance of the input instrument 310 to the display screen to the controller 110, and the controller 110 identifies the proximity distance of the input instrument 310.

In step S202, the controller 110 detects the proximity input of the input instrument, which is the proximity input of the user, as the first, second, or third input.

The embodiment of the present invention classifies the proximity input of the display screen into the first, second, and third inputs, and controls the portable terminal in response to the input combination including at least one of the first, second, and third inputs. In an embodiment of the present invention, the first and second inputs are proximity inputs which are performed in a vertical direction (i.e., upward and downward) to the display screen, as shown in FIGS. 3A and 3B.

Referring to FIGS. 3A and 3B, the user places the input instrument in proximity to the display screen by a predetermined distance D1 which is greater than the distance D2, and the controller 110 detects the proximity input as the first input, i.e. H input, through the detected signal of the display screen 190, as shown in FIG. 3A.

As shown in FIG. 3B, further, when the input instrument is moved closer to the touch screen at a predetermined distance D2, which is less than D1, the controller 110 detects the proximity input as the second input, i.e. L input.

Figure 3C:
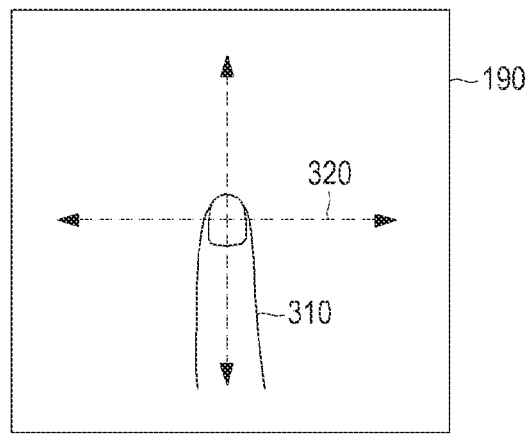
FIG. 3C illustrates a process of controlling an electronic device according to an embodiment of the present invention.
Figure 3D:
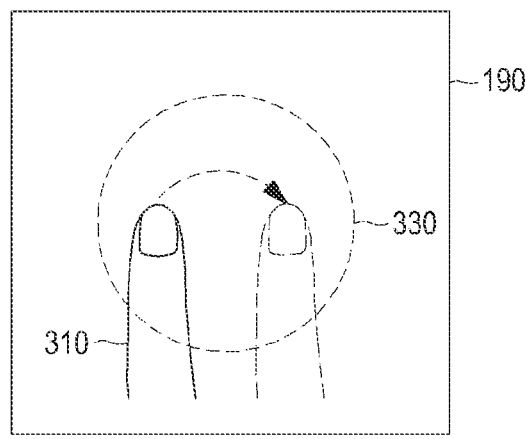
FIG. 3D illustrates a process of controlling an electronic device according to an embodiment of the present invention.

As shown in FIG. 3C, the user places the input instrument 310 proximate to the display screen of the display unit 190 within a predetermined proximity range, for example D1 or D2, and moves the input instrument in a horizontal direction over the display screen, as indicated by reference numeral 320. The controller 110 can detect the horizontal movement of the input instrument as the third input. For example, the user can input the predetermined gesture input while inputting the first or second input with the input instrument 310, for example while placing the input instrument 310 proximate to the display screen. The controller 110 detects the gesture input as the third input. Here, the gesture input by the input instrument 310 is not limited to that indicated by a reference numeral 320 as shown in FIG. 3C.

In other words, the user can input the first or second input by adjusting the proximity distance of the input instrument 310 with respect to the display screen, or input the third input corresponding to the gesture input using the input instrument 310 which is proximate to the display screen.

In step S203, the controller 110 identifies an input combination including at least one of the first, second, and third inputs from among the proximity inputs of the user. In step S204, the controller 110 performs a predetermined function corresponding to the identified input combination.

As described above, the user can combine the proximity inputs including the first, second, and third inputs in different ways, and the controller 110 can identify and perform functions corresponding to the different combinations of the proximity inputs.

In an embodiment of the present invention, the combination input includes at least one of the first, second, and third inputs, which are input during the predetermined time interval, for example 10 ms.

After the first input, i.e. H input, is input as shown in FIG. 3A, the second input, i.e. L input, is input within the predetermined time interval and the first input is input again within the predetermined time interval, so that an input combination of HLH is performed.

As another example, when the third input is input after the passing of the predetermined time interval (after the first input is input and the second input is input within the predetermined time interval), it is identified that an input combination of not HLH, but HL is performed. In other words, according to an embodiment of the present invention, a proximity input, which is input after the predetermined time interval, cannot be identified as the input combination.

FIG. 4 shows an example of different input combinations, for example an input combination of the proximity input which the user can input, and predetermined functions corresponding to the different input combinations. The input combinations and the predetermined functions corresponding to the input combinations can be stored in a form of data in the storage 175.

Referring to FIG. 4, the user inputs the input combinations 410 to 470 to request the portable terminal to perform the predetermined functions 410a-470a corresponding to the input combinations.

In FIG. 4, the input combination 410 indicates that the user inputs only the second input, i.e. L input, shown in FIG. 3B, and the input combination 420 indicates that the user inputs only the first input, i.e. H input, shown in FIG. 3A.

Also in FIG. 4, the input combination 430 indicates that the second input is input and, subsequently, the first combination is input within the predetermined time interval. The input combinations 440 and 450 are performed in a similar manner as that of the input combination 430, but with different inputs during the predetermined time interval.

The input combinations 410 to 450 are achieved by one of the first input, i.e. H input, the second input, i.e. L input, or a combination of one or more of the first and second inputs within the preset time interval. According to an embodiment of the present invention, however, it is possible to combine the third input, i.e. a gesture input, with the first input, the second input, or the input combination of the first and second inputs, to control the operation of the portable terminal 100.

For example, the input combination 460 indicates that the L, H and L proximity inputs are sequentially input within the predetermined time intervals, and, subsequently, the desired third input, i.e. a gesture 1, is input. Likewise, the input combination 470 indicates that the L, H, L and H proximity inputs are sequentially input at the predetermined time intervals, and in turn the desired fourth input, i.e. a gesture 2, is input. Here, the gesture 1 may be an input in which the input instrument, for example a finger, moves horizontally in a left direction over the display screen in proximity to the display screen, and the gesture 2 may be an input in which the input instrument moves horizontally in a right direction over the display screen in proximity to the display screen.

It is assumed that the third input, such as the gesture 1 or 2, is a proximity input like the first and second inputs, which is input in proximity to the display screen. However, the third input may instead be a direct touch input according to another embodiment of the present invention.

In an embodiment of the present invention, the third input may be the proximity input which is input last (i.e., after the first input, the second input, or a combination of both the first and second inputs are input). For example, as indicated by the input combination 460 or 470 shown in FIG. 4, the third input of the gesture 1 or 2 may be the proximity input which is input last after the L, H and L proximity inputs or L, H, L and H proximity inputs are input.

Furthermore, in an embodiment of the present invention, only when the input combinations 410 to 470 are input in an area having a predetermined size on the display screen, does the controller 110 identify the proximity input. For example, as shown in FIG. 3D, only if any one of the input combinations of the first, second, and third inputs is input within an area 330 having a predetermined size and within the predetermined time interval, does the controller 110 identify it as an effective input combination.

As described above, when it is identified that the proximity inputs to the display screen are any one of the input combinations shown in FIG. 4, the controller 110 identifies a predetermined function corresponding to the identified input combination, and controls the portable terminal to perform the corresponding function.

FIG. 4 shows predetermined functions corresponding to the respective input combinations, in which the functions A to G are indicated by reference numerals 410a to 470a. Because these functions can include any function capable of being performed by the portable terminal, the detailed description of the functions A to G will be omitted.

In an embodiment of the present invention, the predetermined functions 410a-470a corresponding to the input combinations 410-470, respectively, may complement or replace functions which correspond to the existing direct touch input. In other words, the predetermined functions 410a to 470a shown in FIG. 4 may not be performed based on the existing direct touch input, may be performed by several direct touch inputs, or may be performed through a separate menu.

For example, when the existing direct touch input enables an object, which is displayed on the display screen, to be selected or performed, the predetermined functions 410a to 470a may cause the object to be displayed in an enlarged or reduced state, or function to display a property of the object.

As another example, when the portable terminal 100 performs an operation mode of writing a note with the input instrument (e.g., a pen), the A function 410a shown in FIG.

4 may correspond to an operation of changing a thickness of an input by the pen, the B function 420a may correspond to a color of the input by the pen, and the C function 430a may correspond to an eraser function. Accordingly, the user can change the thickness of the input by inputting the L proximity input, change the color of the input by inputting the H proximity input, and perform the eraser function by inputting the L and H proximity inputs.

According to an embodiment of the present invention, the predetermined functions 410a to 470a may execute certain applications or access certain data. The user can enter a setting mode and select an application to execute or data to access according to each input combination shown in FIG. 4. For example, if the A function 410a is set to execute an application A, and the B function 420a is set to display a memo B, the controller 110 can execute the application A when the input combination 410 is detected, and display the memo B when the input combination 420 is detected.

Since embodiments of the present invention provide a method of inputting various proximity inputs as described above, it is possible to control the operation of the electronic device, such as the portable terminal, more conveniently and usefully.

It will be appreciated that the methods according to the embodiments of the present invention may be implemented by a computer or a portable terminal including a controller and a memory, and that the memory is an example of a machine-readable storage medium suitable for storing a program or programs including instructions for implementing the embodiments of the present invention. Accordingly, the present invention includes a program including codes for implementing an apparatus or a method which is claimed in any claim of this description, and a storage medium which stores this program and is readable by a machine (e.g., a computer or the like). Also, this program may be electronically conveyed via any medium such as a communication signal transmitted through a wired or wireless connection, and the present invention suitably includes equivalents of this program.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of controlling an operation of an electronic device, the method comprising:
   detecting an input instrument which is proximate to a display screen of the electronic device,
   determining a plurality of movements of the input instrument, wherein each of the plurality of movements is inputted at a predetermined time interval and includes a distance between the input instrument and the display screen for a specific movement from among the plurality of movements, a change of distances for two movements sequentially inputted from among the plurality of movements, and a direction of the change to the display screen, for each of the plurality of movements;
   identifying a first input combination which includes the plurality of movements and a sequence of the plurality of movements and a gesture input subsequent to the plurality of movements; and
   performing a predetermined function corresponding to the identified first input combination, if the first input combination includes predetermined values for the distance, the change of the distance, and the direction of the change,
   wherein each of the plurality of movements is input within an area having a predetermined size.

2. The method as claimed in claim 1, further comprising:
   detecting a third input of the input instrument moving horizontally at a predetermined distance from the display screen.

3. The method as claimed in claim 2, further comprising:
   identifying a third input combination which includes at least one of the first combination, the second combination and the third input and third input sequence of inputs included in the third input combination.

4. The method as claimed in claim 1, further comprising:
   detecting a fourth input inputted in an area of a predetermined size on the display screen among the inputs inputted at the predetermined time interval.

5. The method as claimed in claim 4, further comprising:
   identifying a fourth input combination which includes third input combination and the fourth input inputted in the area of the predetermined size on the display screen.

6. The method as claimed in claim 5, wherein the third input of the fourth input combination is input last.

7. The method as claimed in claim 1, further comprising:
   performing the predetermined function differently from a function carried out when the input instrument touches the display screen.

8. An apparatus for controlling an operation of an electronic device, the apparatus comprising:
   a display unit which detects a proximity input and a proximity distance to a display screen; and
   a controller configured to:
   detect an input instrument which is proximate to the display screen of the electronic device,
   determine a plurality of movements of the input instrument, wherein each of the plurality of movements is inputted at a predetermined time interval and includes a distance between the input instrument and the display screen for a specific movement from among the plurality of movements, a change of distances for two movements sequentially inputted from among the plurality of movements, and a direction of the change to the display screen, for each of the plurality of movements,
   identify a first input combination including the plurality of movements and a sequence of the plurality of movements and a gesture input subsequent to the plurality of movements, and
   performs a predetermined function corresponding to the identified first input combination, if the first input combination includes predetermined values for the distance, the change of the distance, and the direction of the change,
   wherein each of the plurality of movements is input within an area having a predetermined size.

9. The apparatus as claimed in claim 8, wherein the controller is configured to detect a third input of the input instrument moving horizontally at a predetermined distance from the display screen.

10. The apparatus as claimed in claim 9, wherein the controller is configured to identify a third input combination which includes at least one of the first combination, the second combination and the third input and third input sequence of inputs included in the third input combination.

11. The apparatus as claimed in claim 8, wherein the controller is configured to detect a fourth input inputted in an area of a predetermined size on the display screen among the inputs inputted at the predetermined time interval.

12. The apparatus as claimed in claim 11, wherein the controller is configured to identify a fourth input combination which includes the third input combination and the fourth input inputted in the area of the predetermined size on the display screen.

13. The apparatus as claimed in claim 12, wherein the third input of the fourth input combination is input last.

14. The apparatus as claimed in claim 8, wherein the controller is configured to perform the predetermined function differently from a function carried out when the input instrument touches the display screen.

15. A non-transitory computer-readable storage medium which can be read by a processor and includes a program including instructions that carry out a method, the method comprising:
- detecting an input instrument which is proximate to a display screen of the electronic device,
- determine a plurality of movements of the input instrument, wherein each of the plurality of movements is inputted at a predetermined time interval and includes a distance between an input instrument and the display screen for a specific movement from among the plurality of movements, a change of distances for two movements sequentially inputted from among the plurality of movements, and a direction of the change to the display screen, for each of the plurality of movements;
- identifying a first input combination which includes the plurality of movements and a sequence of the plurality of movements and a gesture input subsequent to the plurality of movements; and
- performing a predetermined function corresponding to the identified first input combination, if the first input combination includes predetermined values for the distance, the change of the distance, and the direction of the change,
- wherein each of the plurality of movements is input within an area having a predetermined size.

* * * * *